United States Patent [19]

Arai et al.

[11] 4,280,763
[45] Jul. 28, 1981

[54] SEQUENTIAL CONTROL CIRCUIT MEANS

[75] Inventors: Kenichi Arai, Nakano; Kenji Shibazaki, Aichi; Tsuneo Kitagawa, Toyohashi; Tomoji Murata, Toyokawa; Kenzo Nagata, Okazaki, all of Japan

[73] Assignee: Minolta Camera Kabushiki Kaisha, Osaka, Japan

[21] Appl. No.: 32,104

[22] Filed: Apr. 20, 1979

[30] Foreign Application Priority Data

Apr. 24, 1978 [JP]  Japan .................. 53-49540

[51] Int. Cl.³ .......................................... G03G 15/00
[52] U.S. Cl. ............................... 355/14 R; 355/14 C; 364/518
[58] Field of Search .............. 355/3 R, 14 R, 14 C; 364/518

[56] References Cited

U.S. PATENT DOCUMENTS

| | | | |
|---|---|---|---|
| 3,911,254 | 10/1975 | Leibrecht et al. | 355/14 R X |
| 3,912,390 | 10/1975 | Van Herten | 355/14 R |
| 4,062,061 | 12/1977 | Batchelor et al. | 364/900 |
| 4,137,463 | 1/1979 | Scott et al. | 355/14 R X |
| 4,165,170 | 8/1979 | Donohue et al. | 355/14 R |

FOREIGN PATENT DOCUMENTS 52-134726 11/1977 Japan .
52-134727 11/1977 Japan .
52-134728 11/1977 Japan .

*Primary Examiner*—Fred L. Braun
*Attorney, Agent, or Firm*—Wenderoth, Lind & Ponack

[57] ABSTRACT

Sequential control circuit for sequentially controlling the operation of mechanical equipment, for example, an electrophotographic copying apparatus including various devices having respective smaller devices is characterized in that a first train of clock pulses having a fixed predetermined frequency is converted into a third train of clock pulses whose respective pulses are in synchronism with respective pulses of a second train of clock pulses sequentially generated in accordance with respective driven rates of the sequentially driven devices, so that a respective digital timer circuit which is preset with operational time data of its respective device is capable of successively performing the decrement of the predetermined time in response to the respective pulses of the respective third train of clock pulses.

4 Claims, 11 Drawing Figures

SEQUENTIAL CONTROL CIRCUIT MEANS

BACKGROUND OF THE INVENTION

This invention relates to a control system for a machine or an apparatus, or more particularly, to a sequential control circuit means for controlling the functioning of apparatus such as an electrophotographic copying apparatus comprising various functioning devices including their respective smaller devices to be independently driven through a single driving means via a respective clutch while their respective functioning accomplishments being mutually related from a standpoint of sequential steps, wherein respective sequential instructions for the starting and stopping of the respective devices or mechanical subsystems, including their respective smaller devices are to be specifically controlled through a respective digital timer means constituting the above-mentioned sequential control circuit means, so that all of the devices are successively controlled in a predetermined manner.

According to a conventional sequential control system to be employed for controlling the mechanical machine of the above-described type, respective alternatively timed actuations of operations and stoppings have been accomplished with the help of a conventional digital timer means, which can output a respective pulse defining a specific pulsation interval (alternatively equivalent to the time interval) proportional to the predetermined number of pulses of a pulse train (basic train of clock pulses) at an instance when the number of pulses consecutively generated reaches a predetermined number. More specifically, the conventional sequential control system of the above described type is ordinarily carried out with a digital control system comprising, for example, a microcomputing circuit means provided with the digital timer of the above-described type, in the following sequential order. First of all, the sequential control program containing an operational instruction to call out respective subsystems or devices constituting the machine, including smaller devices as the sequential objects to be controlled in a sequential manner and their respective predetermined operational time data etc., is stored in the memory address of the microcomputer. Then, upon the requirement of the sequential control of the mechanical machine of the above-described type, sequential operational instructions of the respective device and smaller devices and their corresponding operational time intervals are read out through a micro central processing unit CPU, and then, respective operational time intervals (which are commonly each decided from the planning data for the respective devices and smaller devices from a standpoint of the whole sequential control time of the mechanical machine) are successively preset to the specific timer means. Accordingly, the digital timer means which has been preset by the respective data in a manner as described above, are timed with the help of the basic train of clock pulses hving a predetermined cycle, so the the resultant pulse output from the timer serves to control the respective alternative actuation of operation and stoppage of the respective object to be sequentially addressed.

However, according to the timing method of the above-described conventional method, if the operational speed of a certain device varies from the predetermined speed during the operation, the driving of the devices mentioned above is not consistent with that arranged to be actually effected through the present data as mentioned above, and thus results in an inconsistency between the following sequential timings for the actual operation of the mechanical machine and that designed in advance. Therefore, upon the situation as described above, undesirable defects, such as fogging, as far as the electrophotographic copying apparatus is concerned, cannot be avoided.

Conventionally, to overcome the above-mentioned defects resulting from differences between the real and designed operational characteristics with the employment of the conventional control system, some arrangements for maintaining the driving rate, such as maintaining a constant driving speed of the motor, may serve the purpose. However, the unexpected load variations inherently caused by the respective defective production of the devices or the smaller devices mentioned above with reference to the predetermined load level of the respective device or smaller device alternatively causes the fixed electric rating to be varied, and thus, it is difficult to prevent occurrence of variations in the electric source with respect to the fixed electric rating, which consequently results in difficulties in reducing these defects mentioned above.

As for the other measures to overcome the defects described in the foregoing, the successive modification or correction of successive frequencies of the clock pulse train to be sequentially input into the above-mentioned digital timer means in accordance with the respective variations with respect to the respective driving rate in the course of the driving operation of a respective device or smaller device may be considered. However, such successive modification of respective frequencies are not still enough for causing the variations in the driving rate to be effectively compensated, when the magnitude of the inherent defects specific to these devices or smaller devices are to be taken into consideration.

Referring now to FIG. 1, there is shown a conventional pulse generator 8 employing an arrangement of photoelectric coupler 7, operating in synchronism with an operation of the driven means. More specifically, the above-mentioned pulse generator comprises a disc 4, which is coupled to a respective driven shaft 2' of the object mechanical subsystem or device, with the above-mentioned driven shaft 2' itself being connected with a driving shaft 2 of a driving motor 1 through a respective clutch (such as an electromagnetic clutch, however not shown here), and is arranged to have a plurality of slit portions 3 circumferentially regulated by a predetermined central angle with respect to a center of the disc, a radiation lamp 5 disposed to space against the array of slit portions, and a photoelectric element 6 made, for example, of cadmium sulfide, to receive radiation of the radiation light through the array of slit portions mentioned above. According to the above-mentioned pulse generator 8, a train of pulses (here denoted by the second signal composed of the train of pulses), the pulsation of which is proportional to the rate of the respective driven means and is synchronized with the operation of the above-mentioned respective driven means, is generated, so that the timer means mentioned earlier is timed through the second signal. Accordingly, with the help of the arrangement mentioned above, the inconsistency in timing between the sequential instructions to respective driven means and the sequential operations of respective driven means to be controlled is diminished. However, as long as the arrangement mentioned above is employed for the system control of the mechanical apparatus, since the second signal mentioned above is, in turn, only generated for the driven means equipped with the pulse generator, there is such a disadvantage that the respective controls of the other compulsory smaller devices or instruments to be controlled, such as a temperature controller, paper size controller etc. cannot be performed. To overcome the difficulties for applying the above-mentioned conventional arrangement to the respective instrument, it might be taken into consideration of the situation wherein each instrument is specifically supplemented by the above-mentioned arrangement on the condition that the arrangement is independently kept in an operation mode. However, accomplishment of the above-described situation is rather difficult, due to the secondary problems thereby to be brought about, such as rather high electric consumption, undesirable temperature rise, generation of noise, scattering of the toner particles, etc. Still furthermore, even if the second signal is specially introduced into, for example, the microcomputer means, so that the mechanical apparatus, on the whole, is controlled through the timer means specially provided in the microcomputer, inevitable frequency differences among two kinds of pulses, i.e., about 400 KHz for program processing and about 100 KHz of the second signal, is to affect the capability of C P U for processing the predetermined program, and thus, as is clear from the description in the foregoing, the arrangement is rather difficult to put into practice even in a step of utilization of microcomputer means.

SUMMARY OF THE INVENTION

Accordingly, an esential object of the present invention is to provide a sequential control circuit means for controlling the sequential functioning of a plurality of independently driven devices including their respective smaller devices constituting an apparatus such as an electrophotographic copying apparatus, wherein respective unsteady variations in sequential durations for the functioning of the above-mentioned respective devices with reference to the respective predetermined durations, which may be brought about through respective variations in driven rates effected by a driving means, is properly compensated for, to thereby properly accomplish a specific operational object of the above-mentioned apparatus.

Another important object of the present invention is to provide a sequential control circuit means of the above-described type, wherein a sequential series of the respective functioning of a plurality of independently driven devices including their smaller devices constituting an electrophotographic copying apparatus are brought about one by one in accordance with the transportational rate of a copy paper as well as copy paper resultantly bearing a transferring image thereon even under any unsteady driven conditions of the devices, when the sequential control circuit means of the present invention is applied to an electrophotographic copying apparatus.

A further object of the present invention is to provide a sequential control circuit means of the above-described type, wherein the sequential control circuit means of the present invention is combined with a microcomputing circuit means, to thereby cause the substantial sequential control of the electrophotographic copying apparatus to be accomplished by the combination of the sequential control circuit means and the microcomputing circuit means mentioned above.

A still further object of the present invention is to provide a sequential control circuit means of the above-described type, which is constituted through a combination of a plurality of conventional circuit components.

A further object of the present invention is to provide a sequential control circuit means of the above-described type, which is simple in structure and thereby, readily applied to any kind of apparatus, with a high efficiency in use.

In accomplishing these and other objects according to one preferred embodiment of the present invention, there is provided a sequential control circuit means capable of being applied to an electrophotographic copying apparatus which comprises a driving means; a plurality of devices, such as a light scanning device, a copy paper feeding device, a transferring device, a paper transporting device, a fixing device, and their respective smaller devices; and a plurality of timer circuit means capable of respectively outputting respective instruction signals indicative of the actuation of the ON and OFF modes of respective devices, the number of which is at least equivalent to the number of the devices to be sequentially controlled as mentioned above, wherein the respective actuation of the respective circuit means is sequentially controlled by the sequential control circuit means mentioned above.

More specifically, the sequential control circuit means according to the present invention comprises;

(a) a first pulse generator for generating a first train of clock pulses;

(b) a first counting circuit means capable of outputting a first signal indicative of the finishing of every counting of a predetermined number of successive pulses of the first train of clock pulses;

(c) an actuating circuit means for outputting an actuating signal to the first counting circuit means for said counting;

(d) a second pulse generator to be effected into a generating mode of a second train of clock pulses due to an operation of the driving means, with respective pulse intervals of the second train of clock pulses being proportional to a driving rate of the driving means, said pulse interval being correspondingly variable in accordance with a variation of said driving rate of said driving means while being initially set at a predetermined time interval denoted by "t" as an initial reference value which is the minimum variable pulse interval;

(e) a pulse detection circuit means for detecting a pulsation state of the second train of clock pulses; and (f) a logic circuit means for controlling the first counting circuit means to go from a waiting state into a counting mode soon after the incoming of a pulse of the second train of clock pulses is detected, with every operation time "$t_0$" for counting said predetermined number of pulses being arranged to be smaller than said predetermined value "t", so that the timer circuit means performs a time counting operation every time after the counting performance of the first counting circuit means is accomplished to thereby output the instruction signal to the device when the object time to be counted and preset in advance in said timer circuit means is counted out.

Furthermore, the sequential control circuit means further comprises a means for checking an operation condition of the driving means, whereby the first counting circuit means starts counting immediately after a reception of the actuating signal when the driving means is in a non-operational mode, while a successive counting is started after every counting performance of the first counting circuit means is accomplished.

As far as the combination of a microcomputing circuit means and the control circuit means of the present invention is concerned, the sequential control circuit means mentioned above is capable of further comprising microcomputing circuit means provided with the first pulse generator, wherein a program is stored in the microcomputing circuit means in which the decrement operation of the timer circuit means is performed after every completion of the operation time of the first counting circuit means, with the predetermined number of successive pulses of the first train of clock pulses for the counting performance together with the operational time to be counted and preset in advance in the timer circuit means being included as respective numerical data.

Consequently, according to the electrophotographic copying apparatus of the above-described type comprising the combination of the sequential control circuit means and the microcomputing circuit means, the sequential series of functioning accomplishments of the respective devices including their respective smaller devices is brought about in accordance with a transportational rate of the copy paper as well as copy paper resultantly bearing a transferring image thereon, whereby an occurrence of specific defects such as fogging, which may be otherwise encountered through an inconsistency in timing between the transportational rate of the copy paper and the sequential series of functioning accomplishments, are prevented.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 2:
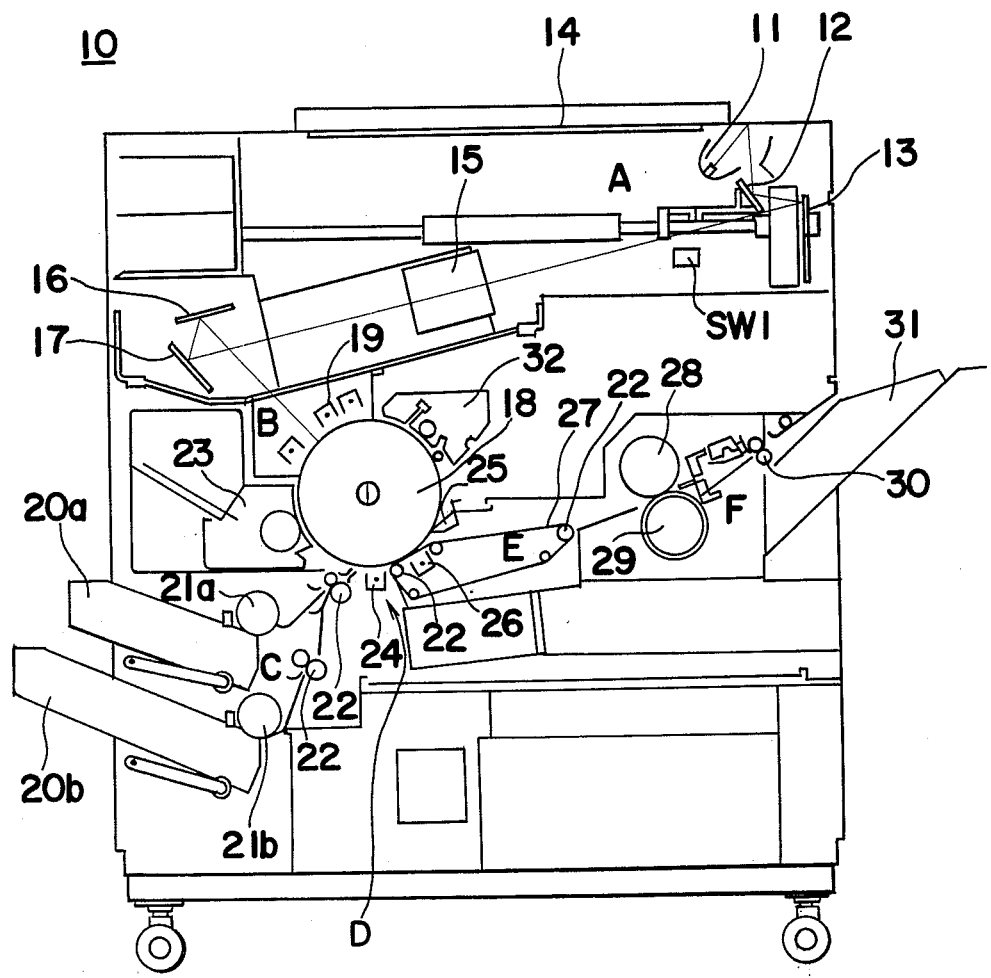
FIG. 2 is a schematic side plain view of an electrophotographic copying apparatus to which a control circuit means according to the present invention is to be applied, with a side cover being omitted for clarity.

Referring first to FIG. 2, there is shown an electrophotographic copying apparatus 10 of the optical light scanning type, to which a sequential control circuit means according to the present invention may be applied. More specifically, the electrophotographic copying apparatus 10 of the above-described type comprises an optical light scanning-mechanism or device A, a latent image producing mechanism or device B, a copy-paper feeding-mechanism or device C, an electrostatic image transferring-mechanism or device D, a copied paper transporting-mechanism or device E, and a fixing-mechanism or device F.

The optical light scanning-mechanism A including a radiation light source 11 and a pair of reflectors 12 and 13 which are arranged to be movable and thereby, capable of scanning in a leftward direction when driven by a rotational force of a driving motor transmitted through an electromagnetic clutch (not shown) and therefore, a copying operation is initiated by an optical scanning functioning of the above-mentioned mechanism A, soon after a switch SW1 such as a lead-switch disposed in a predetermined position is turned to an ON mode.

An original to be copied (not shown here) is first disposed on a certain fixed retaining portion provided for an original disposing portion or original platform 14, whereby the original is light-scanned through the radiation source 11 and thereby, the reflected light of the original (shown by a straight line segment in FIG. 2) is directed onto a surface of a photoreceptor drum 18 through the reflectors 12 and 13, an image focusing lens 15, and a pair of reflectors 16 and 17. The photoreceptor drum 18 is rotatably driven counterclockwise through the rotational momentum caused by the driven motor transmitted with the help of the electromagnetic clutch (not shown here). In the case of rotation in the direction as described in the foregoing, a photoreceptor surface of the photoreceptor drum 18 is first electrically charged through an electric charger 19 before the reception of an imagewise light. Therefore, due to the successive rotation of the photoreceptor drum 18, the imagewise light is directed onto the surface of the photoreceptor surface of the photoreceptor drum 18, thereby forming an electrostatic latent image thereon. The electrostatic latent image thus produced on the photoreceptor surface mentioned above is successively developed through a developing device 23 with the help of toner material, so that the electrostatic latent image is developed into a visible image in a known manner.

As is clear from the description in the foregoing, the above-mentioned radiation light source 11, reflectors 12 and 13, image focusing lens 15, and paired reflectors 16 and 17 constitute the optical light scanning mechanism A; the above-mentioned electric charger 19, developing device 23 together with the photoreceptor surface of the drum 18 mentioned above constitute the toner image forming mechanism B.

Copy paper sheets of predetermined paper sizes and selectively accommodated in either one of two types of cassettes 20a and 20b for this embodiment, depending upon the difference of respective paper sizes, are arranged to be successively transported one by one to a substantially lower portion of the photoreceptor drum 18 through the copy-paper feeding mechanism C comprising respective feeding roller 21a and 21b, which are arranged to be selectively brought about into an operation mode. A toner image on the photoreceptor drum 18 produced through a successive step as described in the foregoing is accordingly transferred to the copy paper sheet transported to a predetermined position, through the image transferring mechanism D including a transferring charger 24. The copy paper sheet thus electrostatically transferred with the original image is successively separated from the surface of the photoreceptor drum 18 at the leading edge thereof by a claw 25 and, thereby further transported to the fixing mechanism F through the copy paper transporting mechanism E which comprises paired transporting rollers 22 driven through a rotational force by the driven motor described earlier and a transporting belt 27 having a discharger 26 therein. The fixing device F mentioned above comprises a heat-roller 28 and a roller 29 urging the copy paper sheet toward the heat-roller 28 mentioned above, so that the image electrostatically transferred on the copy paper sheet is thermally fused and fixed in the course of the forward transporting step with the paired roller mentioned above. Consequently, the copy paper sheet bearing the copied image thereon is introduced into a tray 31 by means of discharge rollers 30. The photoreceptor drum 18 itself if further rotationally moved for a predetermined time interval even after the copy paper sheet mentioned above has been removed from the above-mentioned surface of the photoreceptor drum 18, so that the residual toner material remaining on the surface thereof is removed by a cleaning device 32, and thus one cycle of copying operation is accomplished.

As may be clear from the description in the foregoing, as far as the electrophotographic copying apparatus 10 is concerned, the optical light scanning mechanism A, the copy-paper feeding mechanism C, the image transferring mechanism D, the copied paper transporting mechanism E, etc. are respectively corresponding to the driven subsystem or driven device, and therefore, the above-described subsystems, as a whole, constitute a system to be driven by the driving means. More specifically, the above-mentioned system comprises a process including sequential steps, i.e., the step of exposing the original image through scanning and thereby, forming the electrostatic latent image onto the surface of the photoreceptor drum through the driven device A mentioned above; the step of feeding the copy paper sheet through the transporting route so that the copy-paper is transported to the predetermined position through the driven device C mentioned above; the step of electrostatically transferring the electrostatic latent image onto the copy paper sheet through the driven device D mentioned above; the step of transporting the copied-paper to the successive fixing mechanism F through the driven device E mentioned above and the other steps to be driven through respective driven devices. Accordingly, when the above-mentioned devices A, C, D, E, etc., are sequentially controlled by the timer means, respective subsystems are sequentially actuated with the help of a train of timing signals which are effectively actuated in accordance with the transportational rate of the copy-paper as well as copy paper bearing a transferred or copied image thereon during every copying cycle, so that the specific defects such as fogging are not to be brought about.

Figure 3:
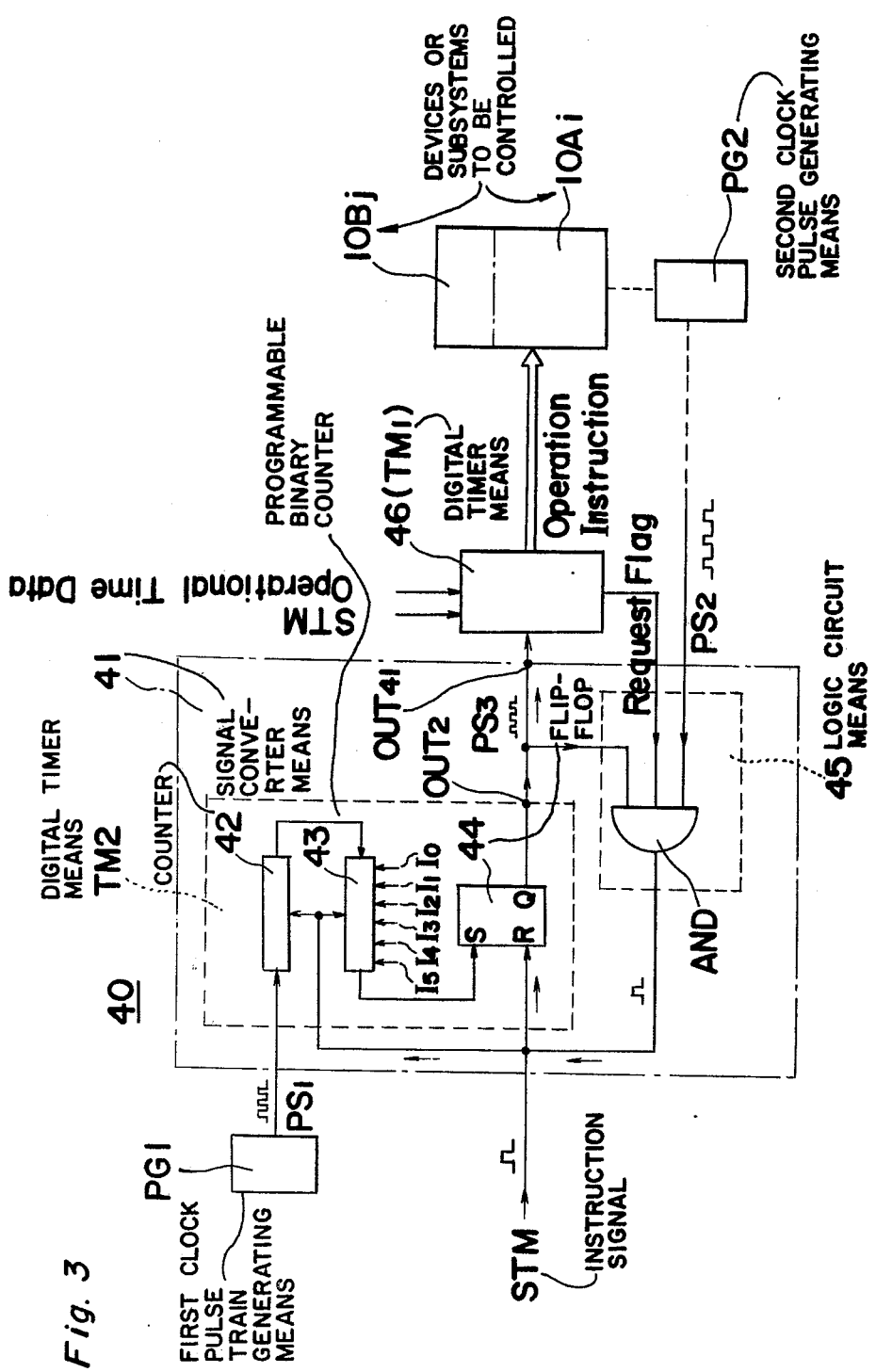
FIG. 3 is a basic block diagram of a control circuit means according to the present invention, particularly showing a controlling feature between the above-mentioned control circuit means and a respective means to be controlled.

Referring now to FIG. 3, there is shown a basic block diagram of a sequential control circuit means 40 for controlling a functioning of a subsystem means adapting a method of system control according to the present invention.

In the basic block diagram mentioned above, there is shown one of the arbitrary driven subsystems or devices such as A, C, D, E, etc. according to the above-mentioned electrophotographic copying apparatus and one of the arbitrary driven instrumental devices or smaller subsystems of a system to be controlled according to the method of the present invention are respectively represented by $10A_i$ and $10B_j$ (wherein $i=1 \ldots n$, $j=1 \ldots m$).

Figure 1:
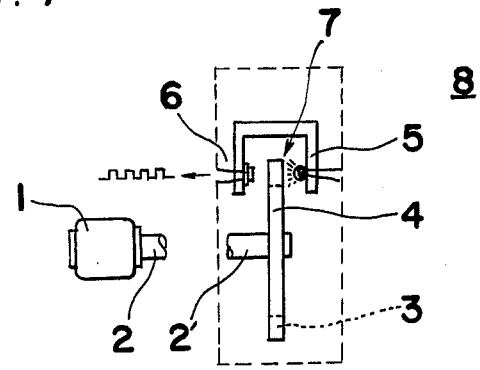
FIG. 1 is a schematic diagram of a pulse generator for generating a train of clock pulses being in synchronism with an operation of the driven subsystem to be sequentially controlled (already referred to)

The control circuitry arrangement mentioned above comprises a circuit means PG1 for generating a first train of clock pulses PS1; a circuit means PG2 for generating a second train of clock pulses i.e., such a type of the pulse generator 8 as explained with reference to FIG. 1 for generating a second train of clock pulses PS2 whose pulse interval is in synchronism with the driven rate of the above-mentioned driven subsystem $10A_i$; a signal converter circuit means 41; and a digital timer means 46 (TM1). The signal converter circuit means 41 mentioned above comprises a digital timer means TM2, and a logic circuit means 45 such as an AND circuit means, wherein the first train of clock pulses PS1 having a certain frequency is converted to that having a specifically predetermined frequency and, thereby, the resultant train of clock pulses mentioned above is further converted to a third train of clock pulses PS3, so that the respective pulses of the third train of clock pulses PS3 are in synchronization with those of the second train of clock pulses PS2 generated in a manner as described earlier.

More specifically, the digital timer TM2 comprises a counter 42, which is, for example, a 6 bit polynominal counter, and is capable of functioning as a frequency divider of the first train of clock pulses PS1; a programmable binary counter 43 (to be hereinafter called preset counter for the sake of brevity) wherein a predetermined operational time corresponding to the binary coded numeral data of 6 bits according to the present embodiment is preset, so that a borrow signal taking the form of one pulse is output at an instance when the above-mentioned predetermined operational time is effected to a count-out-state through a decrement counting operation synchronized with the respective pulse of a train of pulses generated by the counter 42; and a flip-flop circuit means 44 wherein the above-mentioned borrow signal is input through a set-terminal S and its reset-terminal R is input with an instruction signal STM (taking the form of one pulse and being, for example, arranged to be output as one step of the sequential program of a microcomputer employed for the system control according to the present embodiment); the output terminal Q of flip-flop 44 outputs a pulse signal having a pulsation interval relatively proportional to the above-mentioned predetermined time data preset in advance in the counter 43 as described in the foregoing. However, the counter 42 is not compulsory for the circuit arrangement described above, and can be omitted, if necessary.

Figure 4:
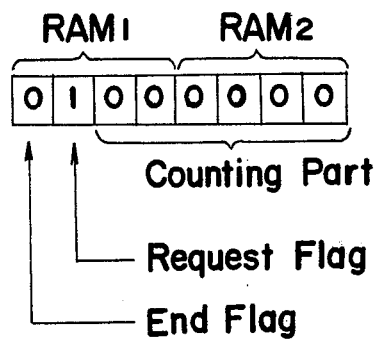
FIG. 4 is a view of a portion of one embodiment of a digital timer means which is applicable to a digital timer means denoted by TM1 in FIG. 3 according to the present invention.

The digital timer means 46 (TM1) outputs a train of signals which is capable of alternatively actuating an operation mode as well as a stop mode of the driven subsystem $10A_i$ to be effected the digital timer means mentioned above functions in the same manner as those brought about by the digital timer means TM2 described in the foregoing. More specifically, the digital timer means 46 for this case may be constituted through a means comprising in combination random access memory parts and a shift register included in the central processing unit CPU of a microcomputer. According to the above-mentioned arrangement of the digital timer means 46, two random access memory parts (i.e., (RAM 1) and (RAM 2)) respectively having 4 bits are paired in parallel as specifically shown in FIG. 4, thereby providing a counting circuit means employing the combination of the lower 2 bits of (RAM 1) and all of the four bits of (RAM 2), which are capable of rendering the functional characteristics as those shown by the preset counter 43 of the above described timer means TM2. As for the remaining upper two bits in a RAM address paired by two RAM portions mentioned above, the uppermost bit of (RAM 1) is used for an end flag section while the following bit of the above-mentioned uppermost bit of (RAM 1) is used for a request flag section. Such being the case, as for the operational time data, a binary coded value generated by summing one to a complement of the predetermined binary coded numeral data mentioned earlier is preset in the above-mentioned counting circuit means and further, the respective rest bits are set at "0" for the end flag and "1" for the request flag, respectively. Thus, as far as the digital timer means TM1 is concerned, after the operational time data together with respective end and request flags having been preset, upon completion of the impressing step of the operational instruction signal STM, the preset counter 43 included in the above-mentioned timer means TM2 is first effected into an operational mode, and thereby, the third train of clock pulses which are output from the output terminal OUT41 of the above-mentioned pulse converter circuit means 41 in a manner as described hereinafter is successively counted until the request flag becomes a "0" and the end flag becomes a "1". The timer circuit means TM1 is capable of being adapted by a timer circuit means such as the above-mentioned timer circuit means TM2, and furthermore, any kinds of timer circuit means can be alternatively employed in place of the timer circuit means TM1 as long as the timer circuit means to be employed is provided with a functional characteristic capable of respective operation and stop actuations of the respective driven subsystem. Naturally, the number of timer circuit means TM1 to be employed are subject to the number of subsystems comprising the system or of devices comprising the mechanical apparatus to be controlled.

Figure 5:
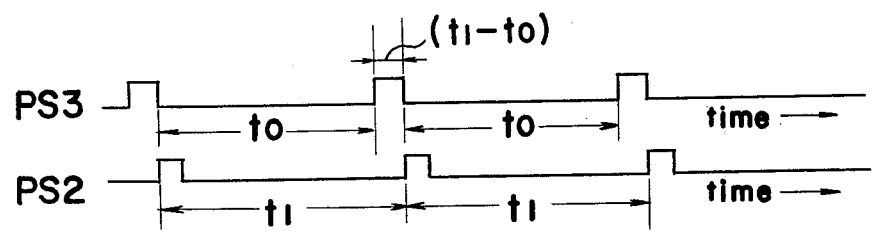
FIGS. 5(a), 5(b) and 5(c) are timing diagrams illustrating the respective correlation between a pulse train PS2 output from a pulse generator denoted by PG2 in FIG. 3 and a pulse train PS3 output from a pulse converting circuit means denoted by 40 in FIG. 3 according to the present invention, wherein the respective intervals of the respective pulse trains PS2 (i.e., $t_2$, $t_3$) are varied due to the variation of the driven device with reference to the designed pulse time interval $t_1$, FIGS. 6(I) and 6(II) are respective schematic diagrams, particularly illustrating respective relationships of the sequential control of the light-scanning mechanism and its following actuation of a solenoid SL1 constituting an electromagnetic clutch provided for a paper-feeding mechanism; more particularly
Figure 5:
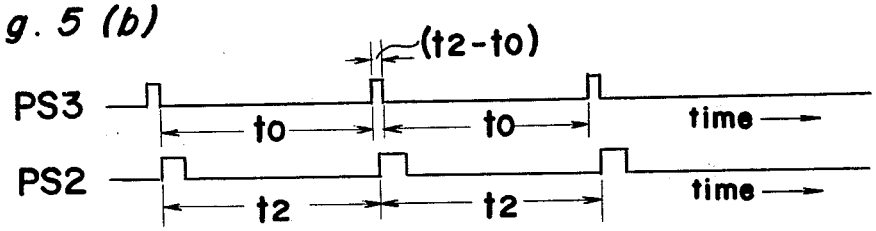
Figure 5:
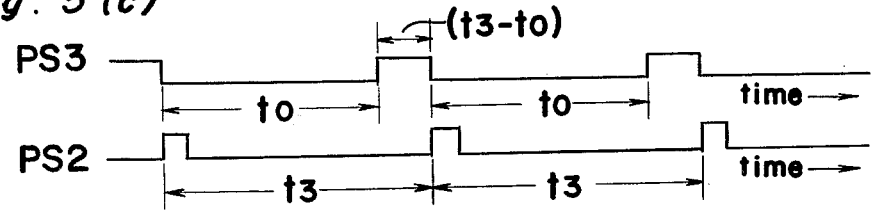

In the following, the functional characteristics of the above-mentioned pulse converting circuit means 41 are described with reference to FIGS. 5(a) to 5(c).

As for the operational time data for counting to be preset in the above-mentioned preset counter 43, the respective time interval for counting, i.e., $t_0$, of the timer circuit means TM2 is, in advance, arranged to be less than a minimum pulse interval $t_2$ successively effected by the second train of clock pulses PS2 as shown in FIG. 5(b), due to the reason that the above-mentioned condition of the minimum pulse interval $t_2$ is often brought about in a situation wherein the functioning rate of above-mentioned subsystem $10A_i$ is varied in the course of its operation in correspondence with the unsteady highest driving rate of the driving motor as mentioned earlier. However, as a matter of fact, the respective time interval for counting, as mentioned above, is adjusted in advance according to the predetermined designed driven rate of the respective $10A_i$, the situation of which is shown in FIG. 5(a), with the respective pulse interval of the second train of clock pulses being represented by $t_1$. Referring now to FIG. 5(c), there is specifically shown the relative relationship between the respective pulse interval of the timer circuit means TM2 and the respective pulse interval of the second train of clock pulses $t_3$, which is brought about in a case where the driven rate of the driven subsystem $10A_i$ is at a minimum in the course of the driven duration thereof.

After the operational time data determined in a manner as described above has been preset in the preset counter 43, upon the impression of the operational instruction signal STM, the counter 42 and the preset counter 43 are actuated so as to start counting, and the flip-flop circuit means 44 is simultaneously reset. Such being the case, the output terminal Q of the flip-flop circuit means 44 is set at "0", thereby outputting a signal of "0" to an output terminal OUT2 of the timer circuit means TM2. After a certain lapse of time, immediately after the above-mentioned preset counter 43 is brought into the counting out state of the above-mentioned operational time data, the flip-flop circuit means 44 is set through the borrow signal output of the preset counter 43 at an instance of the above-mentioned counting out state and thereby, the output terminal Q is set to a state of "1".

Furthermore, as described earlier, upon the impression of the instruction signal STM, the predetermined operational time of the driven subsystem, the request flag of "1" and the end flag of "0" are arranged respectively to be preset in the timer circuit means TM1 and thereby, the timer circuit means TM1 and the driven subsystem $10A_i$ correspondingly controlled following the functioning of the timer circuit means TM1, are both effected into respective operation modes. More specifically, such being the case, with the help of the end flag instruction of the timer circuit means TM1, a mechanism to be driven, such as an electromagnetic clutch provided for the subsystem $10A_i$ is arranged first to be brought in an On-mode, whereby the driven subsystem $10A_i$ is successively actuated into an operational mode through the driving force transmitted through the above-mentioned electromagnetic clutch, and the pulse generator PG2 is effected to start generating the second train of clock pulses.

Successively, the logic circuit means 45 of the pulse converting circuit means 41, an AND circuit means being employed for the present illustrated embodiment, determines the logical continuity state by means of the signal output from the output terminal OUT2 of the timer circuit means TM2 or the output terminal Q of the flip-flop 44, the statment signal of the request flag represented by the above-mentioned timer circuit means TM1 and the second train of clock pulses output from the pulse generator PG2.

Accordingly, due to the circuit arrangement described in the foregoing, if the output signal of the timer circuit means TM2 is in the "1" state, and the request flag is in the "1" state, the logic circuit means 45 outputs a "1" signal, as soon as the earliest pulse, i.e. the "1" state of the second train of clock pulses is further input into the locic circuit means 45. The above-mentioned "1" state output signal from the logic circuit means 45 is input into the counter 42 of the timer circuit means TM2, a resetting terminal of the preset counter 43, and the resetting terminal of the flip-flop 44, respectively, to thereby cause the counter 42, the preset counter 43, and the flip-flop 44 to be reset as can be effected by the impression of the above-mentioned instruction signal STM into these resetting terminals, whereby not only the output terminal Q of the flip-flop 44 is again set to "0", but also the respective counter 42 and 43 are reset so as to again start counting in synchronization with the first train of clock pulses PS1 in a manner as described earlier.

The above-described resetting steps of the components comprising the timer circuit means TM2 are repeatedly accomplihsed, until the timer circuit means TM1 is finally brought into a state of a time-up, or more specifically a state wherein the end flag is set to "1".

Functioning in a manner as described in the foregoing, the signal converting circuit means 41 outputs one of the three sets of clock pulses shown in FIGS. 5(a), 5(b) and 5(c) from its output terminal OUT41, depending upon the driven state of the subsystem.

According to these FIGS. 5(a), 5(b) and 5(c), a respective difference between the pulse interval of the second train of clock pulses PS2 and the pulse interval of the third train of clock pulses PS3, i.e., $(t_1-t_0)$, $(t_2-t_0)$, $(t_3-t_0)$ is a respective waiting time corresponding to a respective time interval to be taken by the logic circuit means 45 for resetting the above-mentioned respective components of the timer circuit means soon after the incoming pulse of the second train of the clock pulses PS2 is detected.

As far as the functioning of the timer circuit means TM1 is concerned, if the respective actuation of counting is arranged to be effected in accordance with every trailing edge of the respective pulse of the third train of clock pulses PS3, the time-counting necessary to be synchronized by the second train of clock pulses PS2 is much more precisely accomplished. Alternatively, the time-counting to be synchronized by the second train of clock pulses PS2 may be precisely accomplished even when the respective actuation of counting is arranged to be effected in accordance with the leading edge of every respective pulse of the third train of clock pulses PS3. The possible alternative actuation of the timer TM1 in respective manners as mentioned above is due to the fact that the influence on the functional characteristics of the above-mentioned timer caused by the functioning of the second train of clock pulses can be substantially negligible, since the pulse frequency of the second train of clock pulses PS2 is ordinarily arranged to be on some 100 Hz orders.

As is clear from the circuit arrangement described in the foregoing, the timer circuit means TM1 is actuated to count the preset operational time of the driven subsystem, being in synchronization with the respective pulsation of the second train of clock pulses PS2. Therefore, even if the undesirable variation in the operational rate of the driven subsystem $10A_i$ occurs in the course of the predetermined driven time through the fluctuational variations either in driving rate of the driving motor or in the load of the driven subsystem, the timer circuit means TM1 relatively to counts the preset time with the counting deviation being simultaneously compensated for with the help of the circuit arrangement of the present invention. More particularly, as a matter of fact, according to the circuit characteristics of the present invention, the real overall driven amount actually required for the respective driven subsystem $10A_i$ as for the respective constituent of the system, is substantially performed in a manner as previously proposed in the form of the operational time data of the respective timer circuit means TM1, whereby the complete sequential control of the operations of the respective subsystems are to be relatively well accomplished.

Figure 6:
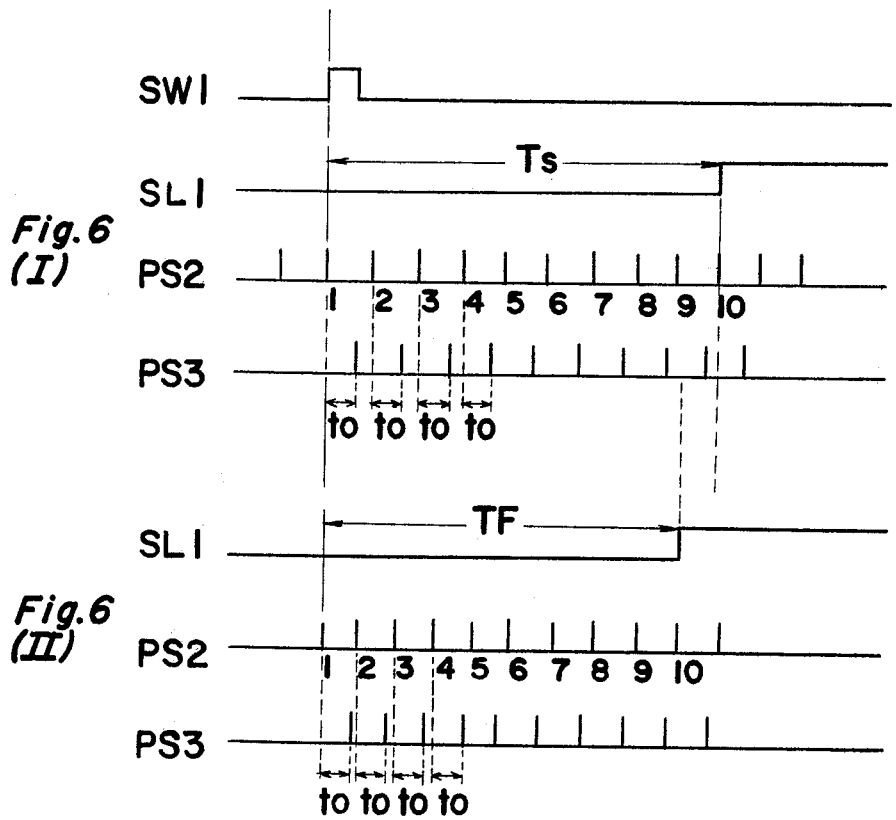
FIG. 6(I) shows a control situation effected in the case shown in FIG. 5(c), and FIG. 6(II) illustrating the case shown in FIG. 5(b)

Referring now to FIG. 6, there is shown the timing for one embodiment in which the light-scanning mechanism is chosen as the reference of the driven subsystem $10A_i$ of the system, i.e., the above-mentioned electrophotographic copying apparatus. More particularly, FIG. 6 exemplarily shows one relationship of the sequential control of the light-scanning mechanism and its following actuation of the solenoid SL1 constituting the electromagnetic clutch provided for the paper feeding mechanism, which is effected with the help of the timer circuit means TM1 mentioned above, whereby the actuation of the operation of the paper feeding mechanism is naturally effected soon after the appropriate time counting of the above-mentioned subsystem is accomplished by the above-mentioned timer circuit means TM1. More specifically, FIG. 6(I) illustrates one of the above-mentioned relationships, which is especially brought about in a case when the driven rate of the above-mentioned subsystem is lowered to a certain extent, with the respective time interval of the consecutive pulsing of the second train of clock pulses PS2 being correspondingly larger than that denoted by $t_1$ in FIG. 5(a). In contradistinction to the situation shown in FIG. 6(I), FIG. 6(II) illustrates a case in which the driven rate of the above-mentioned subsystem is somewhat higher with respect to the predetermined designed rate, with the respective time interval of the consecutive pulsing mentioned above being correspondingly smaller than that denoted by the above-mentioned $t_1$ as shown in FIG. 5(a).

According to the above-mentioned schematic diagrams, there is shown the respective detailed feature, in which, upon completion of the effect of the ON-mode of the switch means SW1 which is ready for actuating the initiation of the light-scanning mechanism of the above-mentioned electrophotographic copying apparatus 10, the timer means TM1 is first to finish counting the predetermined number of pulses substantially equivalent to the operational time really required for the above-mentioned subsystem with the respective waiting for counting being performed and thereby, the above-mentioned solenoid is successively actuated to an ON-mode, soon after the completion of the above-mentioned counting of the predetermined operational time (numerals 10 for either case mentioned above). Consequently, as is clear from the description mentioned above, although the variation in the driven rate of the above-mentioned light-scanning mechanism A affects the real time $T_S$ and $T_F$ required for counting of the entire operational time mentioned above, the substantial predetermined driven amount required for the mechanism A is not at all affected and thereby, fully accomplished.

Figure 7:
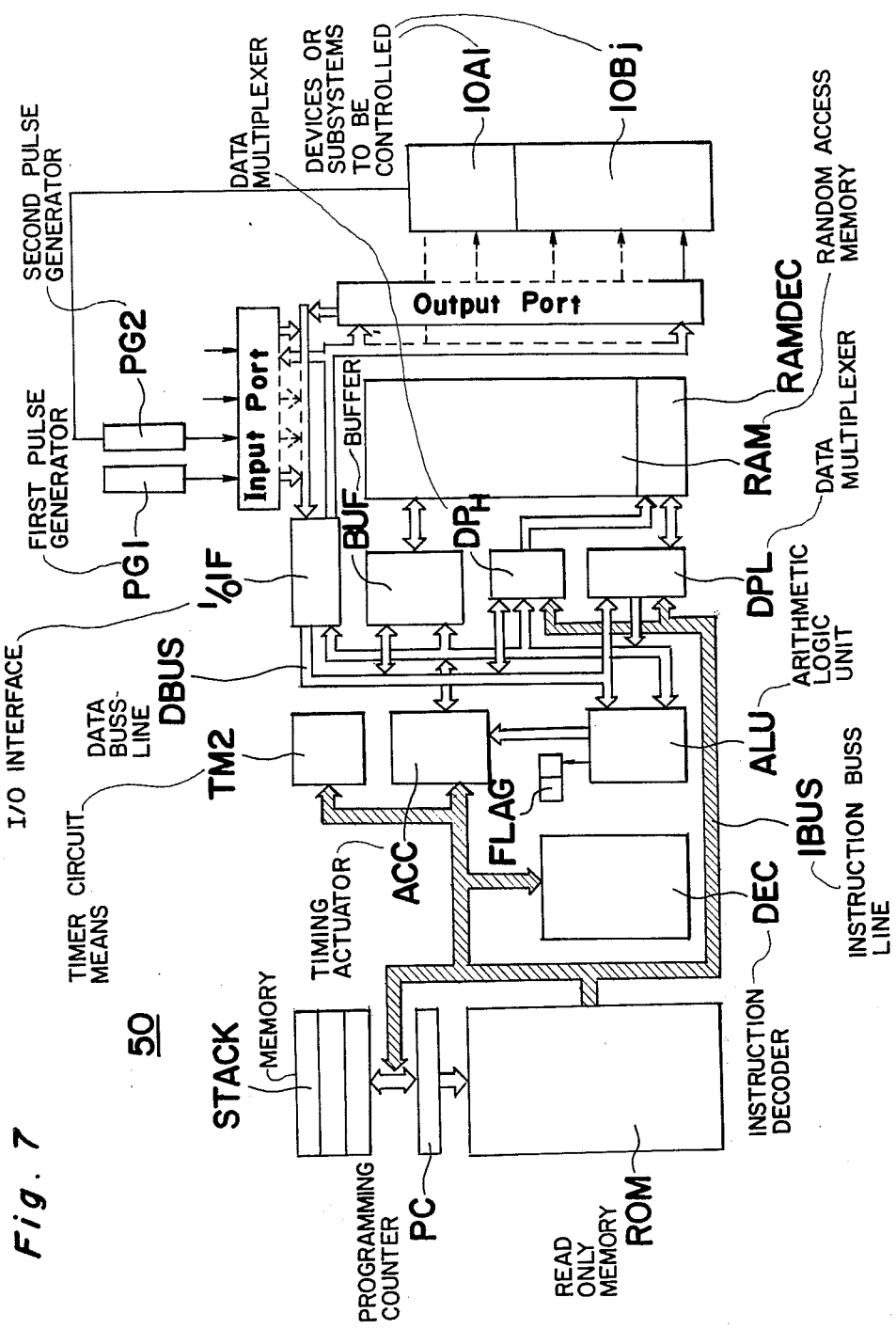
FIG. 7 is a schematic view of one embodiment of a digital control circuit unit comprising the control circuit means according to the present invention.

Referring now to FIG. 7, there is shown one embodiment comprising a digital control circuit unit 50 or a microcomputing circuit means according to the present invention.

The above-mentioned microcomputing circuit means 50 comprises a microcentral processing unit CPU including an arithmetic logic unit ALU, an accumulator ACC, a programming counter PC, an instruction decoder DEC and at least one timing actuator ACC which can impress the actuating instruction to at least one object to be controlled with the help of the above-mentioned timer circuit means TM2 operated in accordance with the train of clock pulses PS1 having a predetermined frequency, which is, however, generated by the first pulse generator PG1 provisionally provided for the present embodiment as shown in FIG. 7, a memory part including a read only memory ROM for storing a control program having the initiation and successive operation time data of the object to be controlled in the form of numerical data, a random access memory RAM for storing the calculated results etc. rendered by the arithmetic logic unit ALU and a stack memory etc., an input-output interface circuit means I/OIF interface, a buffer BUF capable of imparting various kinds of data signals output from ALU, ACC, I/OIF interface together with RAM through a data bus line DBUS, and data multiplexers $DP_H$ and $DP_L$ capable of appointing the address of RAM through the various instructions read out of the contents of ROM with the help of an instruction bus line IBUS.

As for the above-mentioned I/OIF interface, the output port is connected to the respective objects to be controlled such as the respective electromagnetic clutches set between the respective subsystems or devices A, C, D, etc. of the above-mentioned electrophotographic copying apparatus 10 and the driving motor, and the other smaller devices such as a rotational speed controller (not shown) of the driving motor mentioned above, an electric switch means of heat-roller (not shown) etc., while the input port is connected to the above-mentioned pulse generator PG2, control consoles (not shown) etc.

Furthermore, the predetermined number of the above-mentioned timer circuit means TM1 is respectively constituted by the respective combination of the above-mentioned address parts of the RAM and the shift register included in the CPU mentioned above.

The logic circuit means 45 mentioned earlier is provided for inside the I/O interface, and thereby brought into the functional state for the logic determination mentioned earlier soon after the reception of an instruction-signal TTM effected through the instruction-signal stored in the ROM as a part of the sequential control program so as to be imparted thereto subject to the sequential flow of the program mentioned above.

Figure 8:
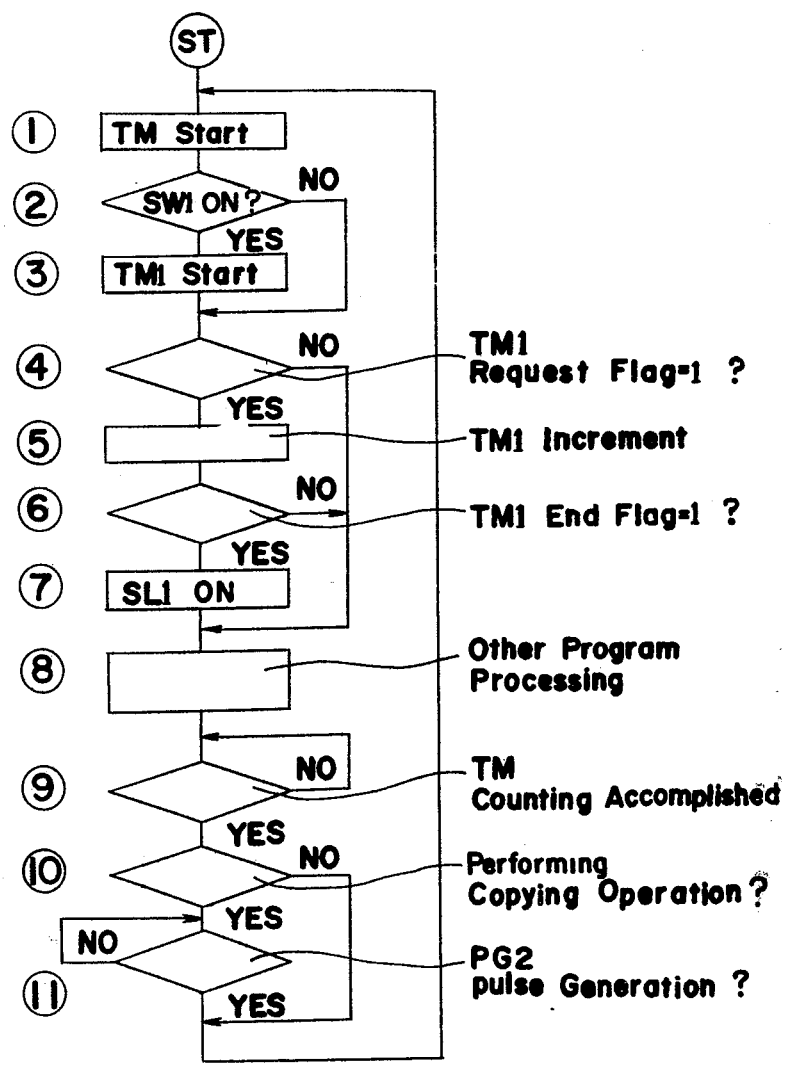
FIG. 8 is a control flow chart for a partial sequential control of the above-mentioned electrophotographic copying apparatus according to the present invention.

Referring now to FIG. 8, there is shown a control flow chart of the sequential control of the above-mentioned electrophotographic copying apparatus 10 according to the above-mentioned digital control unit 50 comprising the control circuit means of the present invention.

A basic timer TM shown in FIG. 8 is substantially equivalent in function to the second timer circuit means TM2 mentioned earlier.

More specifically, the above-mentioned control flow chart exemplarily shows the specific flow of steps for controlling the functioning of the light-scanning mechanism A, wherein a combination comprising the radiant light source 11 and the paired reflectors 12 and 13 are to be shifted toward left from the present position of the combination mentioned above, thereby to accomplish the light-scanning for an image-wise exposing process including an introducing step for the initial shifting of the combination mentioned above and a successive substantial exposing step.

In a step labeled (1), the above-mentioned STM instruction-signal is impressed into the reset terminal R of the flip-flop circuit means 44 of the basic timer mentioned above, thereby actuating the counting operation of the basic timer TM.

In a step labeled (2), the ON-mode of the above-mentioned switch circuit means SW1 is first checked, and thereby, the control flow proceeds to a successive step labeled by (3) if the above-mentioned switch circuit means SW1 is in the ON-mode. However, the step labeled (3) is skipped and, therefore, the control flow proceeds to a step labeled (4), if the above-mentioned switch circuit means SW1 is in an OFF-mode.

In the step labeled (3), not only the predetermined time data is preset in the counting portion of the timer circuit means TM1 constituted in the RAM part in a manner as described earlier (this timer circuit means TM1 is to be hereinafter called the timer circuit means TM1-1), but also the respective request and end flags, i.e., "1" for the request flag and "0" for the end flag, are preset.

In the step labeled (4), the request flag of the timer circuit means TM1-1 is checked, whereby the control flow proceeds to a step labeled (5) if the above-mentioned request flag is in the state of "1", while the control flow is jumped to a step labeled (8), if the above-mentioned flag is in the state of "0".

In the step labeled (5), if the state of the request flag of the timer circuit means TM1-1 is "1", an increment of $+1$ is effected into the timer circuit means TM1-1 with the help of the pulse signal output from the Q output-terminal of the flip-flop circuit means 44 of the above-mentioned basic timer TM.

In a step labeled (6), the state of the end flag of the timer circuit means TM1-1 is first checked. Therefore, as long as the above-mentioned state is a "1", the control flow proceeds to a step labeled (7) while being jumped to the step labeled (8) if the above-mentioned state is "0".

In a step labeled (7), as long as the counting amount preset in advance for the timer circuit means TM1-1 has already been accomplished, with the end flag mentioned above being in the state of "1", the above-mentioned solenoid SL1 is effected into the ON-mode, and further, successive operational time data for the substantial exposing operational time data is preset in the timer circuit means TM1, whereby the above-mentioned substantial exposing process is initiated.

In the step labeled (8), the performance of the object program for the functionings of the smaller devices belonging the light-scanning process are to be accomplished.

In the step labeled (9), the predetermined operations are successively accomplished following the predetermined program in accordance with the counting operation of the above-mentioned basic timer TM effected by the above-mentioned signal STM. Furthermore, here, the state of the output terminal Q of the flip-flop circuit means 44 constituting the basic timer TM is checked by means of the above-mentioned signal TTM, whereby the confirmation is accomplished whether the counting of the timer circuit means TM has already been in the time out state or not. If not, (more specifically, if the above-mentioned flip-flop circuit means 44 is not set yet), the flow of the program is prevented from going to the following step labeled (10) until the counting operation mentioned above is fully accomplished.

In the step labeled (10), the confirmation of the operational mode of the above-mentioned copying apparatus 10 is first accomplished, whereby, if the operational mode is found, the flow of the program proceeds to a step labeled (11). However, if not, the flow of the program is returned to the step labeled (1).

More specifically, the sequential control circuit means of the present invention is to further comprise a means for checking an operational condition of the driving means, whereby the basic timer TM is to start counting immediately after a reception of the actuating signal when the driving means is in a non-operational mode, while a successive counting being started after every counting performance of the above-mentioned basic timer TM is accomplished.

In the step labeled (11), the confirmation of the output state of the above-mentioned pulse generator PG2 is first performed, whereby, if the output of "1" is found, or more particularly, the incoming of the second train of clock pulses is found, the flow of performance of the above-mentioned program is returned to the step labeled (1). However, if the above-mentioned state has not been brought about, the above-mentioned flow is retained in the "waiting state" mentioned earlier, until the above-mentioned state is changed to a "1" from the state of "0". Naturally, a period of the above-mentioned "waiting state" corresponds to the "waiting time" mentioned above with reference to FIG. 5.

Accordingly, as is clear from the description in the foregoing, as long as the finding in the step labeled (2) is that the switch circuit means SW1 of the copying apparatus 10 is maintained in the OFF-mode, the counting performed by the above-mentioned circuit means TM1 (the timer circuit means TM1-1 for this embodiment) is not actuated. However, upon the completion of the actuation of the switch circuit means SW1 into the ON-mode, the counting performance of the timer TM1 is accomplished, with every counting actuation mentioned above synchronized with the respective pulses of the train of clock pulses PS2 in a manner as described in the step labeled (11) and therefore, the predetermined counting of the present light-scanning mechanism is performed within the steps labeled (3) to (5). More particularly, in the step labeled (5), the timer circuit means TM1-1 performs the above-mentioned increment operation, with the time interval of the respective increment being equivalent to the time interval or the pulsation interval of pulses of the second train of clock pulses PS2. Consequently, as a result, the instruction timing signal effected by the timer circuit means TM1-1, is adequately output, with the time deviation from the predetermined operational time of the light-scanning mechanism being satisfactorily compensated.

As is clear from the description in the foregoing, according to the present invention, the first train of clock pulses having the fixed predetermined frequency is first converted into the third train of clock pulses whose respective pulses are in synchronism with respective pulses of the second train of clock pulses correspondingly generated in accordance with the respective variable driven rate of the driven subsystem or device constituting the above-mentioned apparatus, so that the respective digital timer circuit means preset with the operational time data of the respective subsystem mentioned above is capable of performing of the decrement of the predetermined time in response to the respective pulses of the third train of clock pulses, whereby the instruction signal for an operation or a stop of the above-mentioned subsystem is quite properly given and controlled. More specifically, even if the driven rate of the device constituting the apparatus happens to be varied in the course of the operation, the above-mentioned digital time circuit means is capable of performing the decrement of the predetermined operational time data, with the variation in the driven rate being simultaneously compensated, whereby a sequential control system of the driven devices is provided without causing any sequential time deviation among successive performances of the devices even under the undesirable driven conditions of the devices.

Furthermore, even for the control of the smaller devices constituting the subsystem or device to be controlled, the overall control of the device including the control of the smaller devices can be easily accomplished in the same manner as described in the foregoing with the help of the conventional microcomputer, only if the above-mentioned microcomputer comprises the system control arrangement proposed by the present invention.

Although the present invention has been fully described by way of example with reference to the accompanying drawings, it is to be noted that various changes and modifications are apparent to those skilled in the art. Therefore, unless otherwise such changes and modifications depart from the scope of the present invention, they should be construed as included therein.

What is claimed is:

1. A mechanical apparatus including a plurality of devices, and a sequential control means which is adapted to control with a timer means the actuating timing with respect to at least one of an operational mode and a stop mode of at least one of said plurality of devices, said sequential control means comprising:

(a) a first pulse generator for generating a first train of clock pulses;
   (b) first counting means operatively connected to said first pulse generator for counting the number of pulses of said first train of clock pulses, said first counting means being adapted to be timed up upon the completion of the counting of a predetermined number of said pulses of said first train of clock pulses, the time period $t_0$, necessary to count said predetermined number of pulses of said first train of clock pulses, being predetermined;
   (c) a second pulse generator for generating a second train of clock pulses in response to an operation of means for driving said mechanical apparatus, with respective pulse time intervals of said second train of clock pulses being correspondingly variable in accordance with a variation of the driving rate of said driving means, the minimum value t of a pulse interval of said second train of clock pulses being longer than said time period $t_0$;
   (d) second counting means operatively connected to said first counting means and adapted to count each time said first counting means performs said counting of said predetermined number of pulses of said first train of clock pulses, said second counting means used as a counter of said timer means and outputting a control signal upon completion of the counting of a specific number, said specific number being predetermined in accordance with said actuating timing with respect to at least one of said operational mode and said stop mode of said at least one device to be controlled; and (e) actuating means to enable said first counting means to start counting in accordance with the detection of the first pulse generated by said second pulse generator, after said first counting means has been timed-up;

whereby the timing of the generation of said control signal of said second counting means is correspondingly varied in accordance with said respective pulse time intervals of said second train of clock pulses, such that the operation of said at least one of said plurality of said devices is controlled in accordance with said variation of said driving rate of said driving means.

2. A mechanical apparatus as claimed in claim 1, wherein said sequential control means further includes means for checking the operating stage of said driving means, said first counting means being adapted to immediately start a successive counting operation, when said driving means is in a non-operational mode, and said second counting means imparting control signals to other devices of said plurality of said devices, said other devices having no driving correlation with said driving means.

3. A mechanical apparatus including a plurality of devices, in which the control of the actuating timing of at least one of an operational mode and a stop mode of at least one of said plurality of devices is adapted to be executed through a computing means in cooperation with a timer means, said computing means comprising:

(a) a first pulse generator for generating a first train of clock pulses for regulating the operation of said computing means;

(b) a control program for controlling said computing means in accordance with said regulation caused by said first train of clock pulses, one routine of said control program having a predetermined time period $t_0$;

(c) a second pulse generator for generating a second train of clock pulses in response to an operation of means for driving said mechanical apparatus, the respective pulse time intervals of said second train of clock pulses correspondingly variable in accordance with a variation of the driving rate of said driving means, a minimum pulse time interval t of said second train of clock pulses predetermined to be longer than said time period $t_0$; and (d) counting means to count up the completion of every operation relating to said one routine of said control program, said counting means for counting said timer means and being capable of outputting a control signal upon the completion of the counting a specific number, said specific number being programmed in accordance with the occurrence of said actuating timing of at least one of said operational mode and said stop mode of said at least one device to be controlled;

wherein said control program includes a waiting order for inhibiting a successive repeat of said routine prior to the detection of said pulse generated by said second pulse generator after said one routine of said control program has been executed, whereby the timing of the generation of said control signal by said counting means is correspondingly varied in accordance with said respective pulse time intervals of said second train of clock pulses, such that the operation of said at least one of said plurality of said devices is controlled in accordance with said variation of said driving rate of said driving means.

4. A mechanical apparatus as claimed in claim 3, wherein said computing means further includes means for checking the operating state of said driving means, said control program programmed to immediately start said successive repeat of said routine thereof, when said driving means is in a non-operational mode, and said counting means being adapted to impart control signals to other devices of said plurality of said devices, said other devices having no driving correlation with said driving means.

* * * * *